US008260217B2

(12) United States Patent
Chang et al.

(10) Patent No.: US 8,260,217 B2
(45) Date of Patent: Sep. 4, 2012

(54) BIDIRECTIONAL WIRELESS MICROPHONE SYSTEM WITH AUTOMATIC LOGIN FUNCTION

(75) Inventors: Sheng-Hsiung Chang, Taipei County (TW); Sheng-Yuan Chang, Taipei County (TW)

(73) Assignee: Taiwan Gomet Technology Co., Ltd., Taipei County (TW)

( * ) Notice: Subject to any disclaimer, the term of this patent is extended or adjusted under 35 U.S.C. 154(b) by 568 days.

(21) Appl. No.: 12/607,784

(22) Filed: Oct. 28, 2009

(65) Prior Publication Data

US 2010/0112939 A1 May 6, 2010

Related U.S. Application Data

(60) Provisional application No. 61/109,517, filed on Oct. 30, 2008, provisional application No. 61/115,557, filed on Nov. 18, 2008.

(51) Int. Cl.
*H04B 1/38* (2006.01)

(52) U.S. Cl. ....................................... 455/90.3; 455/411

(58) Field of Classification Search ............... 455/569.2, 455/575.1, 575.9, 90.3
See application file for complete search history.

(56) References Cited

U.S. PATENT DOCUMENTS 7,119,832 B2 10/2006 Blanco et al.
2004/0023641 A1 * 2/2004 Tsutsumi et al. ............. 455/411

* cited by examiner

*Primary Examiner* — Tu X Nguyen
(74) *Attorney, Agent, or Firm* — WPAT, P.C.; Anthony King

(57) ABSTRACT

A bidirectional wireless microphone system with an automatic login function comprises at least one wireless microphone, a base station and a data processing unit. The wireless microphone and the base station are able to wirelessly communicate with and transmit data, such as a sound signal, coordinate position or image, to each other. The data processing unit is connected to the base station to store and process the data transmitted between the wireless microphone and the base station. While the wireless microphone completes a process of registration to the base station by engaging a first registration contact on the wireless microphone with a corresponding second registration contact on the base station, a process of logging in to the data processing unit, which can be, for example, a computer or an application program, is completed at the same time to thereby simplify the registration and login process and save operating time.

12 Claims, 5 Drawing Sheets

BIDIRECTIONAL WIRELESS MICROPHONE SYSTEM WITH AUTOMATIC LOGIN FUNCTION

FIELD OF THE INVENTION

The present invention relates to a bidirectional wireless microphone system, and more particularly to a bidirectional wireless microphone system with the function of automatically logging in to a computer or an application program.

BACKGROUND OF THE INVENTION

With the increased criminal events in the society, such as illegally possessing weapons, drug trafficking, smuggling, inflicting bodily injuries, murdering, etc., many law enforcement staffs, particularly policemen, got injured or killed or were missing when they went out on duty. It is also quite often that disputes arise between traffic policemen on duty and traffic violators. To ensure the safety of policemen on duty, increase the accuracy of evidence collection by the law enforcement staffs, reduce the disputes and suits, and to protect the interests of the general public, in-car video systems have gradually become important products, for which the US Police budgets every year.

Generally, the in-car video system for police patrol car comprises a wireless microphone, a base station, a video camera, and a computer or a digital video recorder (DVR). The wireless microphone is usually carried about by a policeman on duty, the base station is mounted on a police patrol car, and the wireless microphone is able to wirelessly communicate with the base station. U.S. Pat. No. 7,119,832 discloses a wireless microphone for use with an in-car video system, which comprises a base station, a video recording device, and a wireless microphone. The in-car video system of U.S. Pat. No. 7,119,832 is characterized in that the video recording device is electrically connected to the base station and has two operating modes, namely, recording mode and standby mode, and that, according to the current operating mode of the video recording device, the base station can transmit a radio-frequency (RF) signal to remotely control the wireless microphone to turn on or to enter the standby state, and that the wireless microphone further comprises a visual indicator for informing the user of the current operating state of the in-car video system.

Usually, a policeman going on duty would first turn on the in-car video system on the police patrol car before he starts performing task. Then, the policeman has to manually enter his name and policeman ID number, and further enters a personal password to log in to the computer for confirming his user identity. Finally, the policeman has to register the wireless microphone to the base station to pair the wireless microphone to the base station before he can go out on duty. That is, each time before the policeman goes on duty, he has to first manually input personal information and complete the registration and pairing process for the wireless microphone and base station to be used. It is of course very inconvenient to do so.

Further, the police patrol car is equipped with various apparatuses such that the available space is largely reduced. To protect the policemen in the space-limited police patrol car against getting injured in the event of an accident, relevant safety regulations prohibit the mounting of large-sized articles on the dashboard or the roof of the car. However, according to the currently available wireless microphone systems, the registration contacts via which the wireless microphone is registered to the base station are provided on the bulky base station while the latter is frequently required to be mounted in the car at some place that is not easily accessible by the user, bringing inconveniences to the policemen.

Moreover, most of the currently available wireless microphone systems are so designed that every base station can only work with one wireless microphone. In the case that two or more policemen go out on duty and use the same police patrol car, two or more base stations must be mounted in the car. However, with the space-limited car, it would be very difficult to mount these base stations at proper positions therein.

SUMMARY OF THE INVENTION

A first object of the present invention is to provide a bidirectional wireless microphone system with an automatic login function, so that a user need not repeat entering data for login and an increased operating efficiency can be achieved.

A second object of the present invention is to provide a bidirectional wireless microphone system with an automatic login function, so that each base station can work with a plurality of wireless microphones at the same time to reduce the number of base stations to be mounted in a police patrol car, and the base station can be more easily mounted since the space required for mounting the base station in the police patrol car is largely reduced.

A third object of the present invention is to provide a bidirectional wireless microphone system with an automatic login function, so that the registration contacts via which a wireless microphone is registered to a base station are not necessarily provided on the bulky base station and the registration process can be more conveniently completed.

To achieve the first object, the bidirectional wireless microphone system with the automatic login function according to the present invention comprises at least one wireless microphone, a base station and a data processing unit. The at least one wireless microphone has a unique serial number, and comprises a first registration contact, a first sound receiving unit for receiving a sound signal, a first wireless transceiver for transmitting and receiving data comprising the sound signal, and a first microcontroller coupled with the first registration contact, the sound receiving unit and the first wireless transceiver. The base station is able to perform bidirectional wireless communication with the at least one wireless microphone, and comprises a microphone ID registration unit, a second wireless transceiver, and a second microcontroller coupled with the microphone ID registration unit and the second wireless transceiver. The microphone ID registration unit has at least one second registration contact. The data processing unit is connected to the base station for storing and processing the data transmitted from the at least one wireless microphone, and comprises a login interface. By engaging the first registration contact on the at least one wireless microphone with a corresponding one of the at least one second registration contact on the base station, the at least one wireless microphone completes an ID registration and pairing process on the base station, and the unique serial number of the at least one wireless microphone is transmitted via the microphone ID registration unit of the base station to and stored on the data processing unit. On receipt of the unique serial number, the data processing unit automatically generates a user name or a user ID number corresponding to the unique serial number on the login interface. When the user confirms the generated user name or user ID number, the at least one wireless microphone is allowed to log in to the data processing unit.

To achieve the second object, the bidirectional wireless microphone system with the automatic login function according to the present invention comprises a plurality of wireless microphones, a base station and a data processing unit. Each of the wireless microphones has a unique serial number and comprises a first registration contact, a first sound receiving unit for receiving a sound signal, a first wireless transceiver for transmitting and receiving data comprising the sound signal, and a first microcontroller coupled with the first registration contact, the sound receiving unit and the first wireless transceiver. The base station is able to perform bidirectional wireless communication with the plurality of wireless microphones, and comprises a microphone ID registration unit, a second wireless transceiver, and a second microcontroller coupled with the microphone ID registration unit and the second wireless transceiver. The microphone ID registration unit comprises a plurality of second registration contacts. The data processing unit is connected to the base station for storing and processing the data transmitted from the wireless microphones. By engaging the first registration contact on each of the wireless microphones with a corresponding one of the second registration contacts on the base station, the wireless microphones complete an ID registration and pairing process on the base station. After the ID registration and pairing process, the wireless microphones can separately or simultaneously perform bidirectional wireless communication with the base station, and the sound signals transmitted from the plurality of wireless microphones are stored in a data entity, such as a video file, at different audio tracks to avoid the risk of being mixed to interfere with one another.

To achieve the third object, the bidirectional wireless microphone system with the automatic login function according to the present invention comprises at least one wireless microphone, a base station, an external ID registration box and a data processing unit. The at least one wireless microphone has a unique serial number and comprises a first registration contact, a first sound receiving unit for receiving a sound signal, a first wireless transceiver for transmitting and receiving data comprising the sound signal, and a first microcontroller coupled with the first registration contact, the sound receiving unit and the first wireless transceiver. The base station is able to perform bidirectional wireless communication with the at least one wireless microphone, and comprises a microphone ID registration unit, a second wireless transceiver and a second microcontroller coupled with the microphone ID registration unit and the second wireless transceiver. The microphone ID registration unit comprises at least one second registration contact. The external ID registration box is connected to the microphone ID registration unit via an extension cable to extend the at least one second registration contact from the base station, so that the external ID registration box provides a function the same as that of the at least one second registration contact. The data processing unit is connected to the base station for storing and processing the data transmitted from the at least one wireless microphone. By engaging the first registration contact on the at least one wireless microphone with a corresponding one of the at least one second registration contact on the base station or the external ID registration box, the at least one wireless microphone completes an ID registration and pairing process on the base station. Then, the at least one wireless microphone can perform bidirectional wireless communication with the base station.

With the above arrangements, the bidirectional wireless microphone system with the automatic login function according to the present invention provides one or more of the following advantages:

(1) The base station can wirelessly communicate with a plurality of wireless microphones at the same time.

(2) With the bidirectional wireless microphone system with the automatic login function according to the present invention, the user can use the personally owned wireless microphone as a medium for logging in to the data processing unit, which can be a computer, without the need of entering via a keyboard the user's name and ID number. Thus, it is able to use the wireless microphone and the base station in a simplified and time-saving manner.

(3) The base station allows at least two wireless microphones to register thereto.

(4) The wireless microphone can register to any base station. By physically engaging the first registration contact on the wireless microphone with the corresponding second registration contact on the base station to complete the ID registration, the wireless microphone is paired to the base state and can mutually turn on each other to transmit signals without the risk of being confused with other base station or wireless microphone.

(5) The bidirectional wireless microphone system with the automatic login function according to the present invention can be applied to an in-car video system for a police patrol car or other security surveillance system that requires image and sound recording.

(6) The bidirectional wireless microphone system with the automatic login function according to the present invention can further comprise external ID registration boxes, which are externally connected to the second registration contacts of the microphone ID registration unit on the base station via extension cables to thereby provide the same function as the second registration contacts. Since the external ID registration boxes are relatively small in volume, they can be freely installed at any place that is safe and conveniently accessible by the driver and the co-driver without being limited to the bulky base station that can only be mounted to some specific positions in a car.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
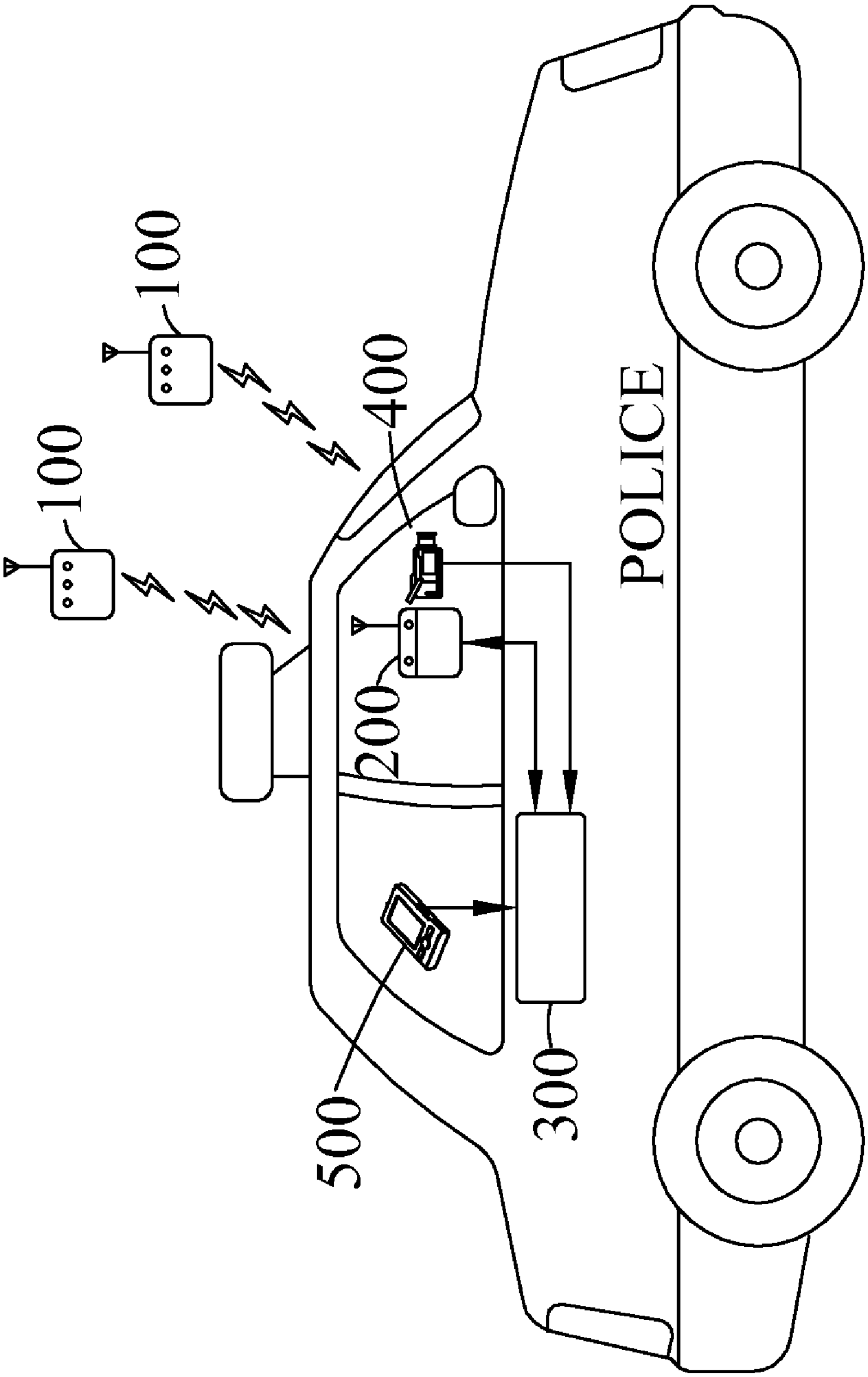
FIG. 1 is a schematic view showing a bidirectional wireless microphone system with an automatic login function according to an embodiment of the present invention.

Please refer to FIG. 1 that is a schematic view showing a bidirectional wireless microphone system with an automatic login function according to an embodiment of the present invention. As shown, the bidirectional wireless microphone system with the automatic login function comprises wireless microphones 100, a base station 200, and a data processing unit 300. The wireless microphones 100 and the base station 200 can perform bidirectional wireless communication and transmission between them. The base station 200 and the data processing unit 300 can be mounted to any vehicles, including but not limited to a police patrol car as shown in FIG. 1. The data processing unit 300 is connected to the base station 200 wirelessly or via a cable for storing and processing all data wirelessly transmitted between the wireless microphones 100 and the base station 200. The data processing unit 300 can be any apparatus with management and storage functions, such as a computer, an application program, a digital video recorder (DVR), a network device or a memory. The data processing unit 300 can also be provided with a wireless network function for transmitting data outward or inward to enable an extended communication distance. The bidirectional wireless microphone system with the automatic login function according to the present invention can be applied to an in-car video system for the police patrol car. The in-car video system comprises at least a video camera device 400 and a global positioning system (GPS) 500, which are connected to the data processing unit 300. Data such as recorded images and position coordinates acquired by the camera device 400 and the GPS 500, respectively, are transmitted to and stored on the data processing unit 300.

Figure 2A:
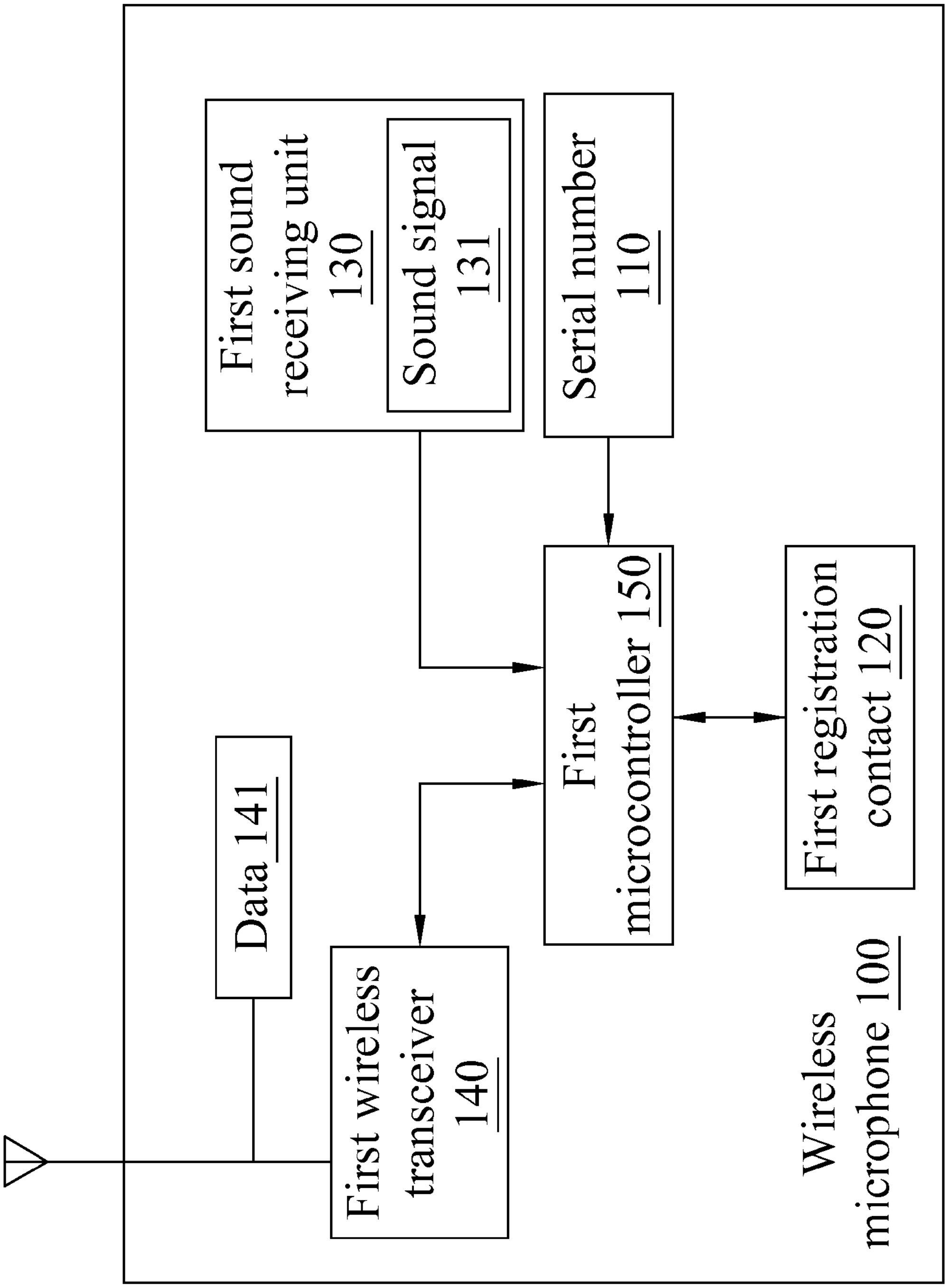
FIG. 2A is a block diagram of an embodiment of the wireless microphone shown in FIG. 1.
Figure 2B:
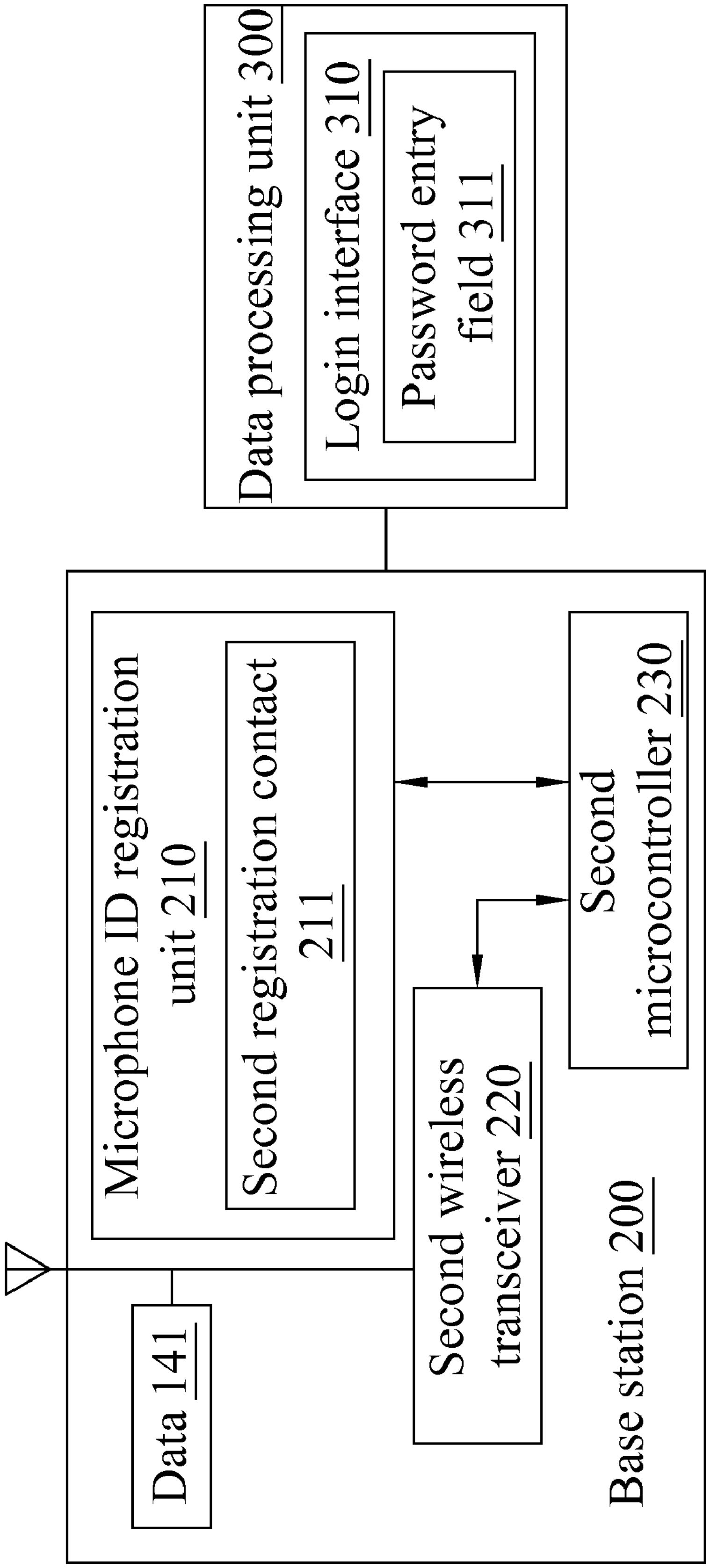
FIG. 2B is a block diagram of an embodiment of the base station and the data processing unit shown in FIG. 1.

Please refer to FIG. 2A that is a block diagram of an embodiment of the wireless microphone 100 shown in FIG. 1; and to FIG. 2B that is a block diagram of an embodiment of the base station 200 and the data processing unit 300 shown in FIG. 1. As shown in FIG. 2A, each of the wireless microphones 100 has a unique serial number 110, and mainly comprises a first registration contact 120, a first sound receiving unit 130, a first wireless transceiver 140, and a first microcontroller 150. The first registration contact 120, the first sound receiving unit 130 and the first transceiver 140 are coupled with the first microcontroller 150. The first sound receiving unit 130 is able to receive a sound signal 131. For example, the first sound receiving unit 130 can be used to record the conversation between a traffic policeman and a traffic violator, and wirelessly transmit the recorded conversation to the base station 200 via the first wireless transceiver 140. The base station 200 is connected to the data processing unit 300, as shown in FIG. 2B. The base station 200 mainly comprises a microphone ID registration unit 210, a second wireless transceiver 220, and a second microcontroller 230. The microphone ID registration unit 210 and the second wireless transceiver 220 are coupled with the second microcontroller 230. The wireless microphones 100 and the base station 200 can have multiple communication channels. By engaging the first registration contact 120 on each of the wireless microphones 100 with a corresponding second registration contact 211 on the microphone ID registration unit 210, the wireless microphones 100 and the base station 200 can transmit respective identification (ID) data and channel protocol used to each other to thereby complete a required ID registration and pairing process. After the ID registration and pairing process, the wireless microphones 100 and the base station 200 would have the same communication channel and ID data to enable bidirectional remote control and transmission and receiving of data 141, such as the sound signal 131, between them.

Figure 3:
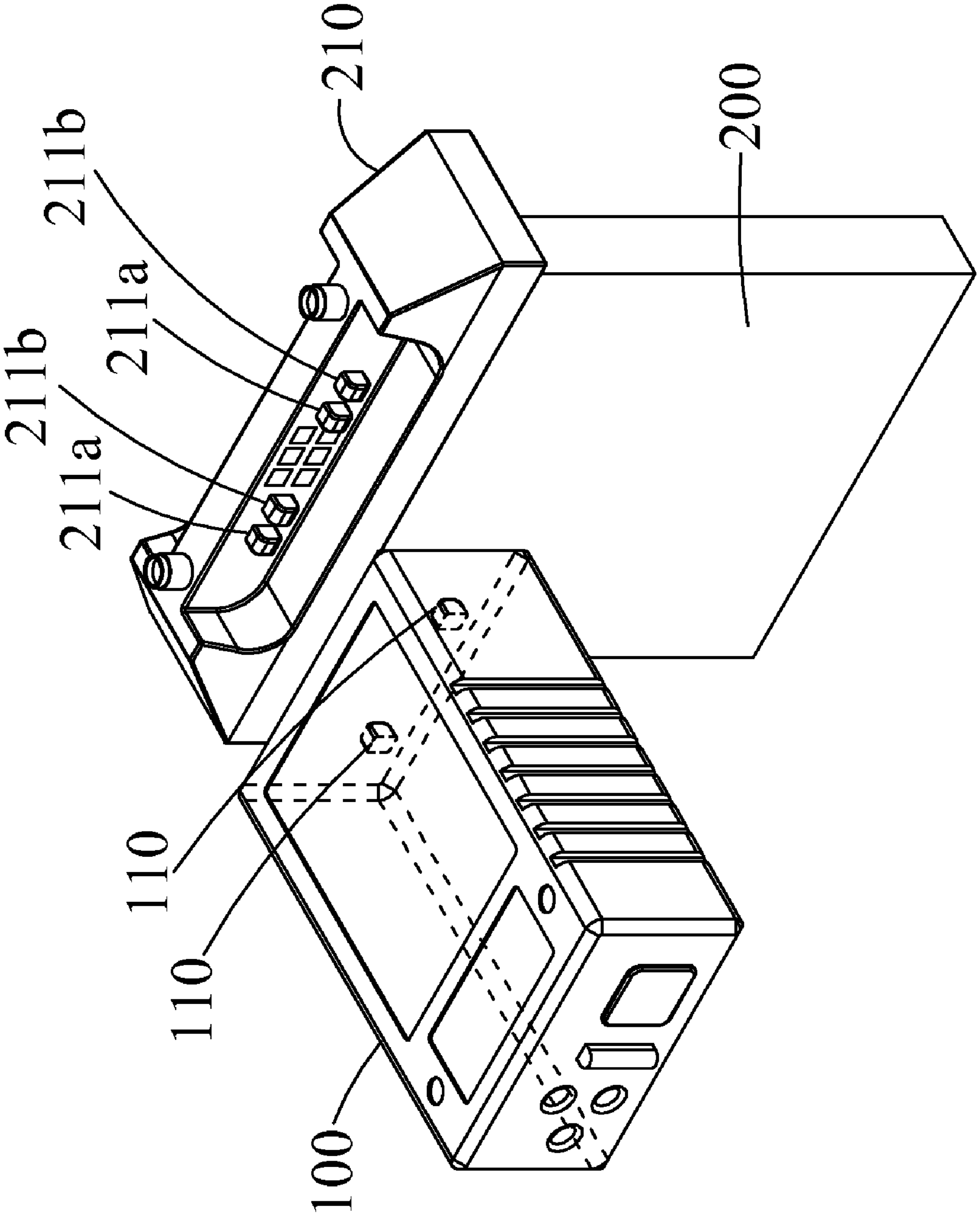
FIG. 3 schematically shows the manner in which the wireless microphone of the present invention is registered to the base station.

The microphone ID registration unit 210 may comprise a plurality of second registration contacts 211 to allow the registration and pairing of a plurality of wireless microphones 100 to the base station 200. For instance, the microphone ID registration unit 210 of the base station 200 as illustrated in FIG. 3 is provided with two pairs of second registration contacts 211*a* and 211*b*. The wireless microphones respectively carried by a driver and a co-driver can be registered via the second registration contacts 211*a* and 211*b*, respectively, to the base station 200 for the two wireless microphones 100 and the base station 200 to have an agreed communication protocol for them, so as to complete the ID registration and pairing process. That is, the base station 200 is able to receive the data 141 from the two wireless microphones 100 at the same time. Therefore, the base station 200 can have two independent pairs of physical second registration contacts 211*a* and 211*b* to accept the registration of two wireless microphones 100 thereto. The two wireless microphones 100 being used by the driver and the co-driver can be distinguished by the second registration contacts corresponding thereto. Moreover, the sound signals from the driver's and the co-driver's wireless microphone 100 can be stored in a data entity, such as a video file, at different audio tracks. That is, the sound signals from the driver's and the co-driver's wireless microphone 100 can be separately recorded on a left and a right audio track and be transmitted from the base station 200 to the data processing unit 300, which can be a computer or a DVR, and can be combined with and stored along with an image file created via video recording. The left and the right audio track can be separately monitored without the risk of confusing the driver's talk with the co-driver's talk. Therefore, the recorded audio and video data can be advantageously adopted as evidences by a judge in making a sentence. Since every base station 200 allows the registration of two or more wireless microphones 100 thereto at the same time, more than half of the space required for mounting the base station 200 of the present invention in the police patrol car can be reduced, and thus the base station 200 can be more easily mounted to a desired position in the car.

When the first wireless microphone 100 is registered to the base station 200 by engaging the first registration contact 120 thereof with the corresponding second registration contact 211*a*, the serial number 110 of the first wireless microphone 100 is transmitted via the microphone ID registration unit 210 to and stored in the data processing unit 300 to complete the registration of the ID data of the first wireless microphone 100 and the selection of the agreed communication channel between the first wireless microphone 100 and the base station 200. Similarly, the second wireless microphone 100 is registered to the base station 200 by engaging the first registration contact 120 thereof with the corresponding second registration contact 211*b* to complete the registration of the ID data of the second wireless microphone 100 and the selection of the agreed communication channel between the second wireless microphone 100 and the base station 200. Therefore, when the two wireless microphones 100 complete the ID registration and pairing process via the corresponding second registration contacts 211*a* and 211*b*, the two wireless microphones 100 can separately or simultaneously perform bidirectional wireless communication with the base station 200.

In the registration process, the serial number 110 of the wireless microphone 100, such as a machine ID or a media access control (MAC) address thereof, is transmitted via the microphone ID registration unit 210 to the data processing unit 300. On receipt of the serial number 110, the data processing unit 300 will compare the serial number 110 of the wireless microphone 100 with user names or user ID numbers previously stored in or newly added to the data processing unit 300, and further automatically retrieves the user name or user ID number that corresponds to the serial number 110 and sends them to a corresponding input position on a login interface 310 of the data processing unit 300, which can be, for example, a computer or a DVR. When the user confirms the data, the process of login to the data processing unit 300 is completed. To provide an enhanced security mechanism and security control, the login interface 310 can further comprise a password entry field 311 for the user to further enter a personal password to complete the login process. Therefore, with the bidirectional wireless microphone system of the present invention, the user can use a personally owned wireless microphone 100 as a medium for logging in to, for example, a police in-car video system without the need of entering via a keyboard the user's name and ID number. Thus, with the present invention, it is able to use the wireless microphone and the base station in a simplified and time-saving manner and to replace an RFID.

Figure 4:
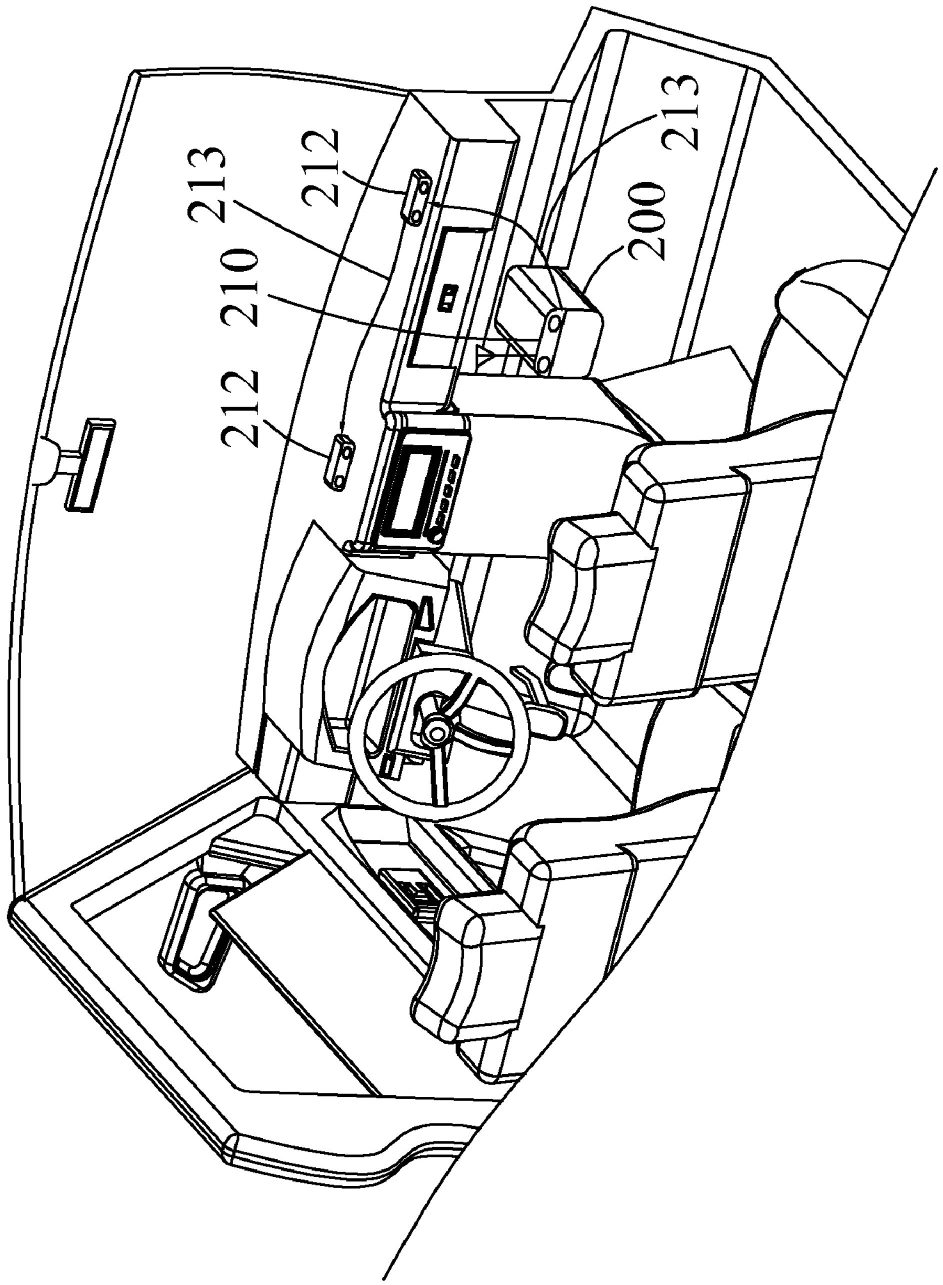
FIG. 4 schematically shows the microphone ID registration unit on the base station with external ID registration boxes.

Further, as shown in FIG. 4, the microphone ID registration unit 210 can further comprise external ID registration boxes 212, which are externally connected to the second registration contacts 211 of the microphone ID registration unit 210 on the base station 200 via extension cables 213 to thereby provide the same function as the second registration contacts 211. Since the external ID registration boxes 212 are relatively small in volume, they can be freely installed near the driver's seat and the passenger seat, on the dashboard, or at any place that allows the user, such as a policeman, to quickly register his wireless microphone 100. Therefore, it is not necessary to particularly install the bulky base station 200 at some specific position in the space-limited car in consideration of the user's convenience in registering the wireless microphone 100 to the base station 200. Instead, the base station 200 can be invisibly mounted on the backrest, below the seat, in the trunk or any other places to prevent the bulk base station from hitting and injuring the policemen in the car in the event of an accident.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A bidirectional wireless microphone system with an automatic login function, comprising:
- at least one wireless microphone having a unique serial number and further comprising:
  - a first registration contact;
  - a first sound receiving unit for receiving a sound signal;
  - a first wireless transceiver for transmitting and receiving data comprising the sound signal; and
  - a first microcontroller coupled with the first registration contact, the sound receiving unit and the first wireless transceiver;
- a base station capable of performing bidirectional wireless communication with the at least one wireless microphone, and comprising:
  - a microphone ID registration unit comprising at least one second registration contact;
  - a second wireless transceiver for transmitting and receiving the data to and from the first wireless transceiver of the at least one wireless microphone; and
  - a second microcontroller coupled with the microphone ID registration unit and the second wireless transceiver; and
- a data processing unit connected to the base station for storing and processing the data transmitted from the at least one wireless microphone, and comprising a login interface;
- wherein, by engaging the first registration contact on the at least one wireless microphone with a corresponding one of the at least one second registration contact on the base station, the at least one wireless microphone completes an ID registration and pairing process on the base station, and the unique serial number of the at least one wireless microphone is transmitted via the microphone ID registration unit of the base station to and stored on the data processing unit, and the data processing unit on receipt of the unique serial number automatically generates on the login interface a user name or a user ID number corresponding to the unique serial number for the at least one wireless microphone to complete a process of logging in to the data processing unit.

2. The bidirectional wireless microphone system with the automatic login function as claimed in claim 1, wherein the login interface further comprises a password entry field.

3. The bidirectional wireless microphone system with the automatic login function as claimed in claim 1, wherein a plurality of the wireless microphones is comprised, and the base station comprises a plurality of the second registration contacts; and the plurality of wireless microphones, after separately engaging with the corresponding second registration contacts to complete the ID registration and pairing process thereof, are allowed to separately or simultaneously perform bidirectional wireless communication with the base station.

4. The bidirectional wireless microphone system with the automatic login function as claimed in claim 3, wherein the sound signals separately received by the plurality of wireless microphones are stored in a data entity at different audio tracks to avoid the risk of being mixed to interfere with one another.

5. The bidirectional wireless microphone system with the automatic login function as claimed in claim 3, wherein the data entity is selected from the group consisting of a video file.

6. The bidirectional wireless microphone system with the automatic login function as claimed in claim 1, wherein the serial number is selected from the group consisting of a machine ID and a media access control (MAC) address.

7. The bidirectional wireless microphone system with the automatic login function as claimed in claim 1, further comprising an external ID registration box being connected to the microphone ID registration unit via an extension cable to extend the at least one second registration contact from the base station, so that the external ID registration box provides a function the same as that of the at least one second registration contact.

8. A bidirectional wireless microphone system with an automatic login function, comprising:
- a plurality of wireless microphones, each of which having a unique serial number and comprising:
  - a first registration contact;
  - a first sound receiving unit for receiving a sound signal;
  - a first wireless transceiver for transmitting and receiving data comprising the sound signal; and
  - a first microcontroller coupled with the first registration contact, the sound receiving unit and the first wireless transceiver;
- a base station capable of performing bidirectional wireless communication with the plurality of wireless microphones, and comprising:
- a microphone ID registration unit comprising a plurality of second registration contacts;
  - a second wireless transceiver for transmitting and receiving the data to and from each of the first wireless transceivers of the plurality of wireless microphones; and a second microcontroller coupled with the microphone ID registration unit and the second wireless transceiver; and a data processing unit connected to the base station for storing and processing the data transmitted from the plurality of wireless microphones;

wherein, by engaging the first registration contact on each of the wireless microphones with a corresponding one of the second registration contacts on the base station, the wireless microphones complete an ID registration and pairing process on the base station; and, after completion of the ID registration and pairing process, the wireless microphones are allowed to separately or simultaneously perform bidirectional wireless communication with the base station; and the sound signals separately transmitted from the plurality of wireless microphones are stored in a data entity at different audio tracks to avoid the risk of being mixed to interfere with one another.

9. The bidirectional wireless microphone system with the automatic login function as claimed in claim 8, wherein the data entity is selected from the group consisting of a video file.

10. The bidirectional wireless microphone system with the automatic login function as claimed in claim 8, wherein the serial number is selected from the group consisting of a machine ID and an MAC address.

11. The bidirectional wireless microphone system with the automatic login function as claimed in claim 8, further comprising an external ID registration box being connected to the microphone ID registration unit via an extension cable to extend the plurality of second registration contacts from the base station, so that the external ID registration box provides a function the same as that of the plurality of second registration contacts.

12. A bidirectional wireless microphone system with an automatic login function, comprising:

at least one wireless microphone having a unique serial number and comprising:

a first registration contact;

a first sound receiving unit for receiving a sound signal;

a first wireless transceiver for transmitting and receiving data comprising the sound signal; and a first microcontroller coupled with the first registration contact, the sound receiving unit and the first wireless transceiver;

a base station capable of performing bidirectional wireless communication with the at least one wireless microphone, and comprising:

a microphone ID registration unit comprising at least one second registration contact;

a second wireless transceiver for transmitting and receiving the data to and from the first wireless transceiver of the at least one wireless microphone; and a second microcontroller coupled with the microphone ID registration unit and the second wireless transceiver; and an external ID registration box connected to the microphone ID registration unit via an extension cable to extend the at least one second registration contact from the base station, so that the external ID registration box provides a function the same as that of the at least one second registration contact; and a data processing unit connected to the base station for storing and processing the data transmitted from the at least one wireless microphone;

wherein, by engaging the first registration contact on the at least one wireless microphone with a corresponding one of the at least one second registration contact on the base station or the external ID registration box, the at least one wireless microphone completes an ID registration and pairing process on the base station; and, after completion of the ID registration and pairing process, the at least one wireless microphone is allowed to perform bidirectional wireless communication with the base station.

* * * * *